United States Patent
Boon et al.

(10) Patent No.: US 9,910,265 B1
(45) Date of Patent: Mar. 6, 2018

(54) ELECTROWETTING DISPLAY HAVING MISALIGNED COLOR FILTERS

(71) Applicant: Amazon Technologies, Inc., Seattle, WA (US)

(72) Inventors: Gerben Boon, Ottersum (NL); Karel Johannes Gerhardus Hinnen, Eindhoven (NL); Daniel Figura, Piestany (SK)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/754,329

(22) Filed: Jun. 29, 2015

(51) Int. Cl.
*G02B 26/00* (2006.01)
*G02B 26/08* (2006.01)
*G02F 1/29* (2006.01)
*G02B 5/20* (2006.01)
*G02B 5/00* (2006.01)

(52) U.S. Cl.
CPC ........... *G02B 26/005* (2013.01); *G02B 5/003* (2013.01); *G02B 5/201* (2013.01)

(58) Field of Classification Search
USPC ........ 359/237, 242, 245–246, 290–292, 295, 359/296, 298
See application file for complete search history.

(56) References Cited

U.S. PATENT DOCUMENTS

| | | | | |
|---|---|---|---|---|
| 2011/0063334 A1* | 3/2011 | Bitman | ................ | G09G 3/3433 345/690 |
| 2013/0155480 A1* | 6/2013 | Lee | ........................ | G02B 5/201 359/228 |
| 2014/0036208 A1* | 2/2014 | Park | ...................... | G02F 1/1337 349/106 |

* cited by examiner

*Primary Examiner* — Brandi Thomas
(74) *Attorney, Agent, or Firm* — EIP US LLP

(57) ABSTRACT

An electrowetting display comprises a first support plate and a second support plate opposite to the first support plate. A plurality of electrowetting elements is provided between the first support plate and the second support plate. A first fluid is disposed within the electrowetting elements on the first support plate, and a second fluid is disposed on the first fluid. The second fluid is substantially immiscible with the first fluid. A plurality of color filter elements arranged in an array and a black matrix structure are disposed on the second support plate. The black matrix structure is positioned such that the black matrix is offset in at least one direction with respect to the electrowetting elements.

19 Claims, 11 Drawing Sheets

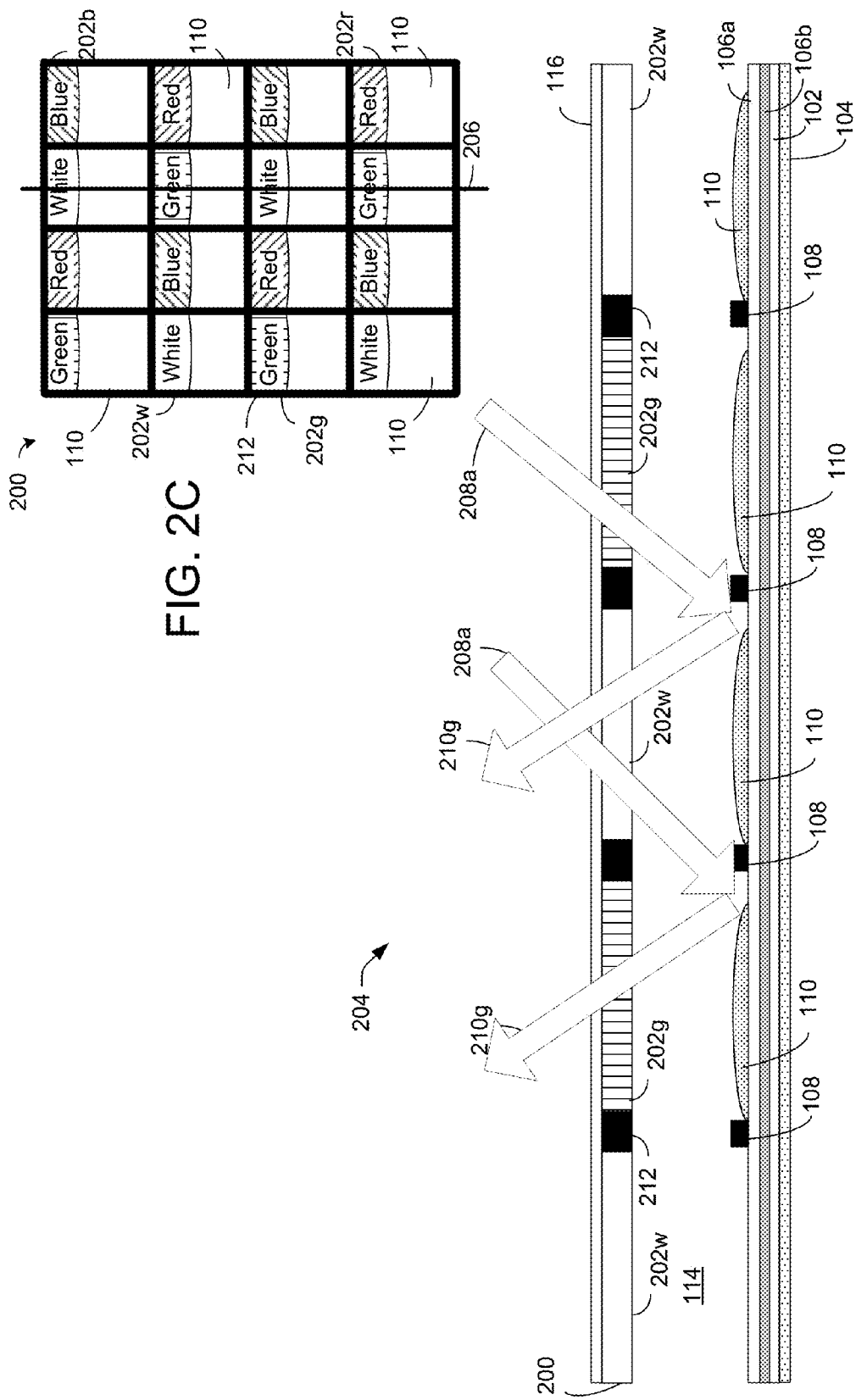

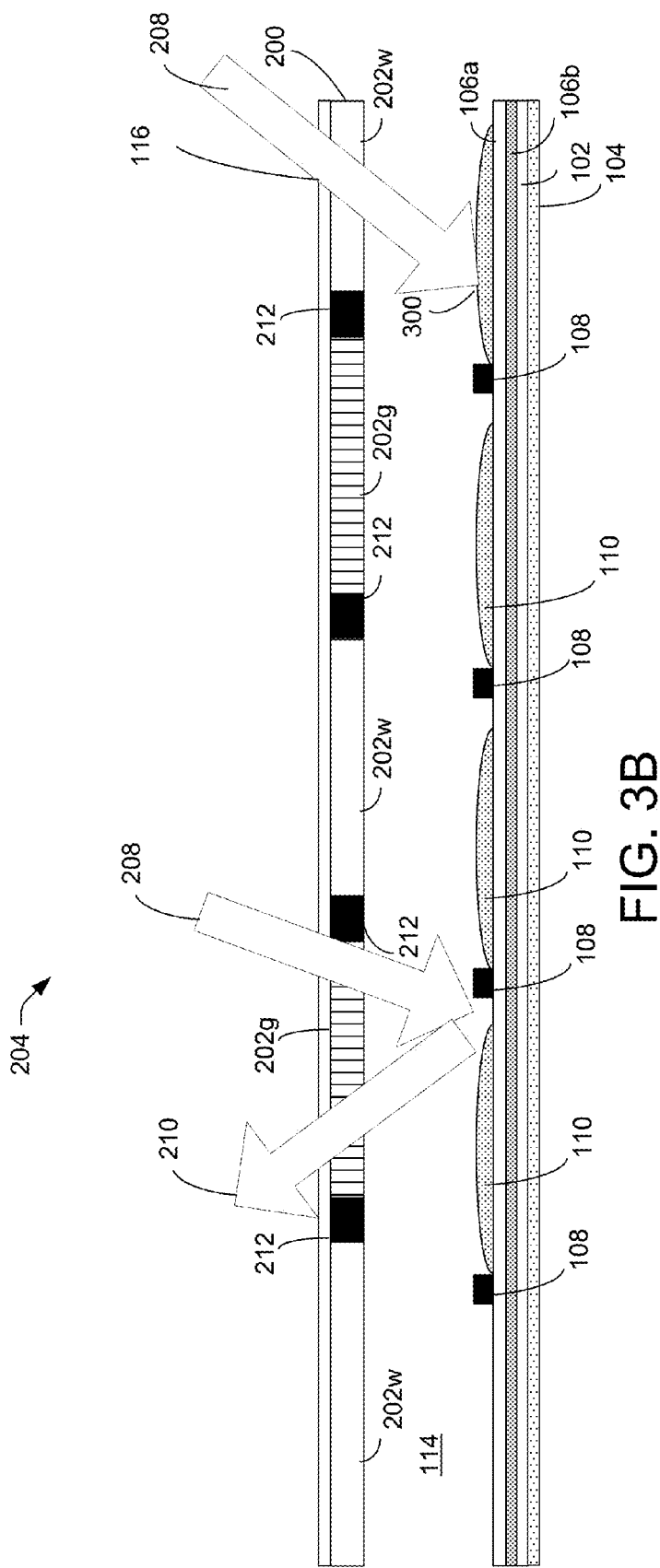

US 9,910,265 B1

ELECTROWETTING DISPLAY HAVING MISALIGNED COLOR FILTERS

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display can affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

A type of electronic display known as an electrowetting display includes an array of pixels individually bordered by pixel walls that retain a fluid such as opaque oil, for example. Light transmission through each pixel is adjustable by electronically controlling a position of the fluid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A-2H schematically illustrate crosstalk among pixels or subpixels of the electrowetting display device of FIG. 1.

FIGS. 3A-3C schematically illustrate light paths of incident and reflected light within pixels or subpixels of an electrowetting display device according to some embodiments.

DETAILED DESCRIPTION

Figure 1:
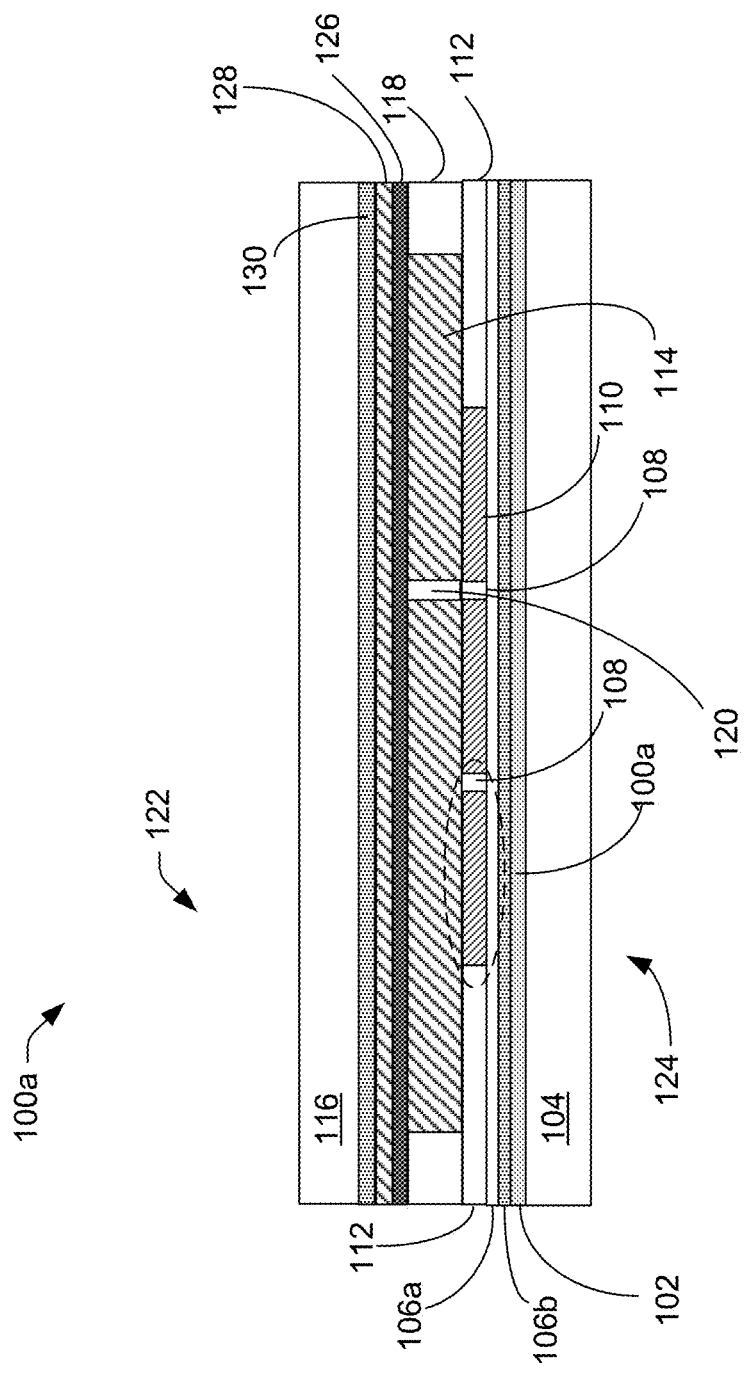
FIG. 1 illustrates a cross-section of a portion of an electrowetting display device, according to some embodiments.

In various embodiments described herein, electronic devices include displays for presenting content. In some examples, the electronic devices may include one or more components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, and the like.

A display device, such as an electrowetting display device, can be a transmissive, reflective, or transflective display that generally includes an array of display elements (e.g., pixels or subpixels that make up pixels) configured to be operated by an active matrix addressing scheme. For example, rows and columns of electrowetting elements are operated by controlling voltage levels on a plurality of source lines and gate lines. In this fashion, the display device can produce an image by selecting particular display elements to a least partly transmit, reflect or block light. Display elements are addressed (e.g., selected) via rows and columns of the source lines and gate lines that are electrically connected to transistors (e.g., used as switches) included in each display element. Transistors take up a relatively small fraction of the area of each display element to allow light to efficiently pass through (or reflect from) the display element. Herein, a display element may, unless otherwise specified, comprise a pixel or subpixel of an electrowetting display device. Such a pixel or subpixel may be the smallest element of a display that is individually operable to directly control an amount of light transmission or reflection through the element. For example, in some implementations, a display element may be a pixel that includes a red subpixel, a green subpixel, a blue subpixel and a white subpixel, i.e. a red-green-blue-white (RGBW) display. In other implementations, a display element may be a pixel that is a smallest component, e.g., the pixel does not include any subpixels.

Electrowetting displays include an array of display elements comprising pixels and/or subpixels located between two support plates, such as a first substrate and a second substrate. For example, the first substrate may be a bottom support plate that, in cooperation with the second substrate (which may be a top support plate), contains display elements that include at least one electrode, a first fluid being an electrowetting oil, a second fluid that includes an electrolyte (i.e. an electrolyte solution) and pixel walls between the support plates. Support plates may include glass, plastic (e.g., a transparent thermoplastic such as PMMA or other acrylic), or other material (transparent or non-transparent) and may be made of a rigid or flexible material, for example. In addition to display elements, spacers and edge seals can also be located between the support plates. Hereinafter, example embodiments are described as including substrates or support plates that comprise glass support plates. However, support plates can comprise any of a number of amorphous materials, such as plastic, glass, quartz, semiconductors, and so on, and claimed subject matter is not limited in this respect. At least one of the support plates is comprised of transparent material. Herein, describing an element or material as being "transparent" means that the element or material can transmit a relatively large fraction of the light incident upon it. For example, a transparent substrate or support plate or layer may transmit more than 70% or 80% of the light impinging on its surface, though claimed subject matter is not limited in this respect.

Individual pixels or subpixels are surrounded by pixel walls made, for instance, from photoresist material. In embodiments, the pixel walls are disposed on the bottom support plate. Pixel walls retain at least a first fluid which is electrically non-conductive, such as opaque or colored oil, in the individual pixels or subpixels. A cavity formed between the support plates is filled with the first fluid (e.g., an electrowetting oil retained by pixel walls) and a second fluid (e.g., an electrolyte solution) which is electrically conductive or polar and may be water or a salt solution such as a solution of potassium chloride in water. The second fluid may be transparent, but may be colored or light absorbing. The second fluid is substantially immiscible with the first fluid so that the first fluid and the second fluid do not substantially mix with each other, and in some examples do not mix with each other to any degree. Herein, substances are immiscible with one another if the substances do not substantially form a solution.

Spacers and edge seals which mechanically connect the bottom support plate with the overlying top support plate, or which form a separation between the bottom support plate and the top support plate, contribute to mechanical strength of the electrowetting display. Edge seals, for example, being disposed along a periphery of an array of electrowetting display elements, may contribute to retaining (e.g., first and second) fluids between the bottom support plate and the overlying top support plate. In embodiments, the spacers may be transparent. In embodiments, transparency of spacers can at least partially depend on the refractive index of the spacer material, which should be similar to or the same as the refractive indices of surrounding media. Spacers are also desirably chemically inert to surrounding media.

In various embodiments, a display element of a display device includes, among other things, an electrode layer and a thin film transistor (TFT) that is switched to either select or deselect the electrowetting element using active matrix addressing. A TFT is a particular type of field-effect transistor that includes thin films of an active semiconductor layer as well as a dielectric layer and metallic contacts over a supporting substrate, which may be glass or any of a number of other materials, for example. Generally, there are various layers between the TFTs and the first fluid.

In some embodiments, a display device as described herein can comprise a portion of a system that includes one or more processors and one or more computer memories, which may reside on a control board, for example. Display software can be stored on the one or more memories and can be operable with the one or more processors to modulate light that is received from an outside source (e.g., ambient room light) or out-coupled from a light guide of the display device. For example, display software can include code executable by a processor to modulate optical properties of individual pixels or subpixels of the electrowetting display based, at least in part, on electronic signals representative of image or video data. The code can cause the processor to modulate the optical properties of pixels or subpixels by controlling electrical signals (e.g., voltages, currents, fields, and so on) on, over, or in layers of the electrowetting display.

In embodiments, an array of color filter elements may be disposed on the top support plate to provide various colored pixels or subpixels within the electrowetting display. During operation of the electrowetting display, a pixel or subpixel may be activated and the second fluid moves onto the hydrophobic layer thus displacing the first fluid, e.g. towards a pixel wall. Light enters the pixel or subpixel through the color filter element and is reflected back through the pixel or subpixel, through the color filter element. Thus, depending on the color of the color filter element, various colors can be produced by the electrowetting display. For example, for an RGBW display, the display includes red, green, blue and white color filter elements. Thus, the light entering the electrowetting fluids and reflecting out of the pixels or subpixels will have one of a red color, a green color, a blue color, a white color.

In embodiments, a black matrix grid may be included. While the black matrix is disclosed herein as being black in order to block the passage of light therethrough, the matrix may be another color.

In various embodiments, the black matrix is disposed on the top support plate and substantially aligned with the pixel walls disposed on the bottom support plate. However, due to various possible factors such as, for example, a gap between the top support plate and the bottom support plate, a gap between a black matrix and the pixel walls, material used for the pixel walls and/or the black matrix, etc., light may enter a pixel or subpixel and be reflected out of an adjacent pixel or subpixel. Thus, incident light may enter through a color filter element in a first pixel or subpixel, but then the reflected light may pass between the black matrix and the pixel wall and exit through a second color filter element associated with an adjacent second pixel or subpixel. This is generally referred to as crosstalk. Thus, white light entering through a white color filter element may be reflected out of the electrowetting display between the black matrix and a pixel wall through a green color filter element, thereby coloring the desired white light to a green color and generally decreasing luminance. However, depending upon the color filter element through which the light enters and the color filter element through which the light exits, the change in color may be a black or very dark color due to the relationship between the two colors within the color spectrum. Thus, there may be a decrease in luminance of the electrowetting display due to the mixing of the two colors.

In accordance with embodiments herein, the black matrix is shifted so that the black matrix is no longer aligned with the pixel walls in at least one direction. Rather, the black matrix grid is generally aligned adjacent to at least one of the pixel walls where over a location in the pixel or subpixel where the first fluid reaches a "peak" (i.e. a height of the first fluid when it is at maximal contraction) when the first fluid moves or contracts along the hydrophobic layer towards the pixel wall. Furthermore, the color filter elements are aligned with locations where the second fluid moves onto the hydrophobic layer to replace the first fluid that has contracted. In accordance with embodiments, the display is a rectangular shape and the black matrix is shifted in only one direction. In embodiments, the one direction is along a major axis of the rectangle.

FIG. 1 is a cross-section of a portion of an electrowetting display device 100a illustrating several electrowetting elements 100b, according to some embodiments. Each electrowetting element 100b represents a pixel or a subpixel. An electrode layer 102 is formed on a bottom support plate 104 (e.g., a glass substrate). The electrode layer 102 is generally a layer containing individual pixel electrodes per pixel or subpixel (electrowetting element 100b) separated from each other by insulating material. In some implementations, an optional dielectric barrier layer 106b may at least partially separate electrode layer 102 from a hydrophobic layer 106a also formed on the bottom support plate 104. In some implementations, the hydrophobic layer 106a can comprise a fluoropolymer, such as AF1600®, produced by DuPont, based in Wilmington, Del. The hydrophobic layer 106a can also be any of a number of water-repelling materials that affect wettability of an adjacent material, for example. In embodiments, the hydrophobic layer 106a is a coating on the dielectric layer 106b.

Pixel walls 108 form a patterned electrowetting element grid on the hydrophobic layer 106a. The pixel walls 108 may comprise a single grid or may comprise a plurality of intersecting pixel walls to form the patterned electrowetting element grid. The pixel walls 108 may comprise a photoresist material, such as epoxy-based negative photoresist SU-8, for example. In an embodiment, the pixel walls 108 are absorbing and non-transparent, e.g. colored or black, in order to prevent or minimize the passage of light therethrough. In embodiments, the pixel walls 108 are non-reflective. The patterned electrowetting element grid comprises rows and columns that form an array of electrowetting elements 100*b*. For example, an electrowetting element 100*b* can have a width and length in a range of about 50 to 500 microns. A first fluid 110, such as an oil, which can have a thickness (e.g., depth or height) in a range of about 1 to 10 microns, for example, overlies the hydrophobic layer 106*a*. The first fluid 110 is partitioned by the pixel walls 108 of the patterned electrowetting element grid. An outer rim 112 can comprise the same material as the pixel walls 108. A second fluid 114, such as an electrolyte solution, overlies the first fluid 110 and the pixel walls 108 of the patterned electrowetting element grid.

A top support plate 116 opposite to the bottom support plate 104 covers the second fluid 114 and edge seals 118 retain the second fluid 114 over the array of electrowetting elements. The top support plate 116 may be supported by edge seals 118 and spacers 120 that are interspersed throughout the array of electrowetting elements 100*b*. For example, some or all spacers 120 may be located over at least a portion of the regions where pixel walls 108 intersect, though claimed subject matter is not limited in this respect. A voltage V applied across, among other things, the second fluid 114 and the electrode 102 of individual electrowetting elements 100*b* can control transmittance or reflectance of the individual electrowetting elements 100*b*, as will be described herein in more detail.

The electrowetting display device 100*a* has a viewing side 122 on which an image formed by the electrowetting display device 100*a* can be viewed, and a rear side 124. The top support plate 116 faces viewing side 122 and the bottom support plate 104 faces rear side 124. In an alternative embodiment, the electrowetting display device 100*a* may be viewed from the rear side 124.

The electrowetting display device 100*a* may be a reflective, transmissive, or transflective type. The electrowetting display device 100*b* may be an active matrix driven display type or a passive matrix driven display, just to name a few examples.

The second fluid 114 is substantially immiscible with the first fluid 110. As previously noted, the second fluid 114 may be an electrolyte solution. An electrolyte solution can be electrically conductive or polar, and may be water or a salt solution such as a solution of potassium chloride in a mixture of water and ethyl alcohol, for example. The second fluid 114 is preferably transparent, but may be colored or light absorbing. The first fluid 110 is electrically non-conductive and may for instance be an alkane like hexadecane or (silicone) oil. In embodiments, the first fluid may be referred to as electrowetting oil. The hydrophobic layer 106*a* is arranged on the bottom support plate 104 to create an electrowetting surface area. The hydrophobic character causes the first fluid 110 to adhere preferentially to the hydrophobic layer 106*a* since the first fluid 110 has a higher wettability with respect to the surface of the hydrophobic layer 106*a* than the second fluid 114. Wettability relates to the relative affinity of a fluid for the surface of a solid. Wettability increases with increasing affinity, and it can be determined by measuring the contact angle formed between the fluid and the solid and is measured internal to the fluid of interest. For example, such a contact angle can increase from relative non-wettability for a contact angle of more than 90° to complete wettability for a contact angle of 0°, in which case the fluid tends to form a film on the surface of the solid.

The first fluid 110 absorbs at least a part of the optical spectrum. The first fluid 110 may be transmissive for a part of the optical spectrum, forming a color filter. For this purpose, the first fluid 110 may be colored by addition of pigment particles or dye, for example. Alternatively, the first fluid 110 may be black (e.g., absorbing substantially all parts of the optical spectrum) or reflecting. In embodiments, any of the layers on bottom support plate 104 may have reflective properties. Additionally, a reflective layer (not illustrated) may also be included on bottom support plate 104. Such a reflective layer (or other layers having reflective properties) may reflect the entire visible spectrum, making the layer appear white, or part of it, making it have a color.

When a voltage is applied across an electrowetting element 100*b* via a common electrode 126 disposed on the top support plate 116 and a corresponding pixel electrode within electrode layer 102, the electrowetting element 100*b* enters into an active state. Electrostatic forces impart motion to the second fluid 114 toward the electrode layer 102, thereby displacing the first fluid 110 causing the first fluid 110 to contract on an area of the hydrophobic layer next to the pixel walls 108, in a droplet-like form. This action uncovers the first fluid 110 at least partly from the surface of the hydrophobic layer 106*a* of the electrowetting element 100*b*. When the voltage across the electrowetting element 100*b* is returned to an in-active signal level of zero or a value near to zero, the electrowetting element 100*b* returns to an inactive state, where the first fluid 110 flows back to cover the hydrophobic layer 106*a*. In this way, the first fluid 110 forms an electrically controllable optical switch in each electrowetting element 100*b*. Of course, such details of an electrowetting display device are merely examples, and claimed subject matter is not limited in this respect.

In embodiments, the electrowetting display device 100*a* may include a color filter layer 128 that is configured as an array of color filter elements. Additionally, the electrowetting display device 100*a* may include a black matrix grid layer 130 that is configured as a grid of black structures or walls. The black matrix grid generally aligns with edges between individual color filter elements. The black matrix grid layer 130 is generally processed on the top support plate 116 first. Then the various color filter elements in the color filter layer 128 are created by lithographic steps. The individual color filter elements may be in contact with each other on top of the black matrix grid but that is generally not visible from the viewing side 122 of the electrowetting display device 100*a* as the black matrix grid layer 130 is the first layer on the top support plate 116. After deposition of the color filter elements, a conducting layer is deposited that serves as the common electrode 126 for the electrowetting display device 100*a*.

Figure 2A:
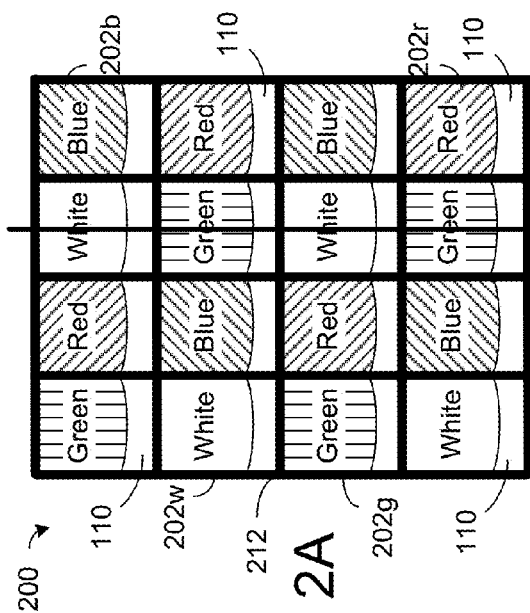

FIG. 2A is a top view of a portion of an array 200 of color filter elements 202 for an electrowetting display device, such as electrowetting display device 100*a*. A black matrix grid 212 may be included with the array 200 of color filter elements and generally comprises a black material or other dark material to block, or substantially block, the passage of light therethrough. While FIG. 2A (as well as FIGS. 2B-2F and FIGS. 3A-3C) illustrate the black matrix grid 212 on a same level as the array 200 of color filter elements, this may not be the case. As previously noted, the black matrix grid 212 may be created in a layer and then the array 200 of color filter elements 202 may be created in a layer on the black matrix grid 212. The array 200 of color filter elements 202 is disposed on the top support plate 116 while the first fluid 110 is disposed on the bottom support plate 104.

In the example of FIG. 2A, the color filter elements 202 are arranged for an RGBW display. Thus, the array 200 includes red, green, blue and white color filter elements 202r, 202g, 202b and 202w, respectively. The array 200 may be arranged differently and configured for other types of displays such as, for example an RGB display, an RGBA (red, green, blue, amber) display, an RGBAW display or other type of display. As can be seen in FIG. 2A, the individual pixels or subpixels have a rectangular shape, however the individual pixels or subpixels may have other shapes such as, for example, square, triangular, hexagonal, etc. Additionally, the array 200 of color filter elements 202 has a substantially rectangular shape and is thus, shaped for use with an electrowetting display device having a substantially rectangular shape. The array 200 could also have a different shape such as, for example, square, triangular, etc. Likewise, electrowetting display device 204 may also have other shapes such as, for example, square, triangular, etc.

Figure 2B:
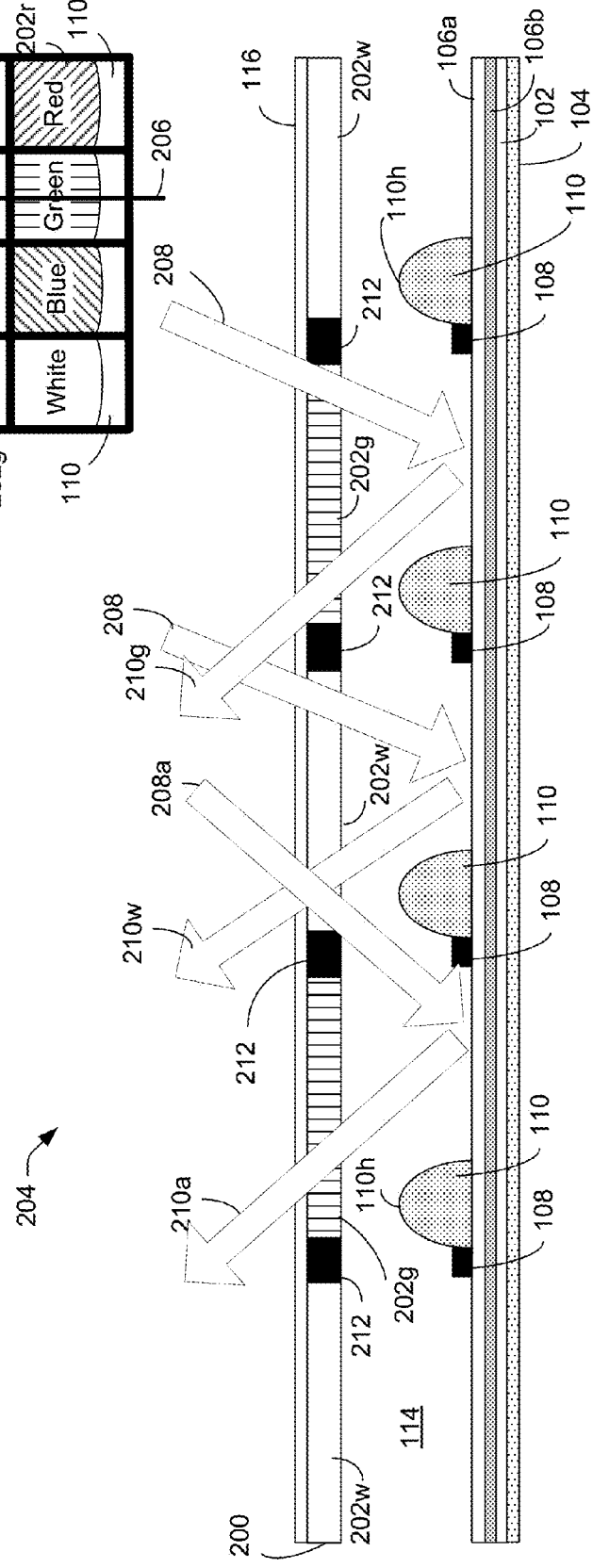

FIG. 2B schematically illustrates a cross-section of a portion of an example of an electrowetting display device 204 similar to the cross-section of the example electrowetting display device 100a illustrated in FIG. 1, as seen along line 206 of FIG. 2A. Various elements of the electrowetting display device may not be illustrated in FIG. 2B, or may be illustrated in a simplified fashion, for clarity and ease of description. For example, common electrode 126 is not illustrated. The electrowetting display device 204 includes the array 200 disposed on the top support plate 116, with edges of color filter elements 202 substantially aligning with the black matrix grid 212, which substantially aligns with the pixel walls disposed on the bottom support plate 104. Thus, the color filter elements 202 are substantially aligned with the pixels or subpixels (i.e. electrowetting elements 100b). As previously noted, FIG. 2B illustrates the black matrix grid 212 on a same level as the array 200 of color filter elements 202 (i.e. the black matrix grid 212 is between edges of adjacent color filter elements) for discussion purposes, but this may not be the case.

As can be seen in FIGS. 2A and 2B, when a pixel or subpixel (i.e. electrowetting element 100b), is activated, i.e. "open," the second fluid 114 replaces the first fluid 110 on the hydrophobic layer 106a. The first fluid 110 contracts on the hydrophobic layer 106a towards a corresponding pixel wall 108. A "peak" of the first fluid 110 is a height 110h of the first fluid 110 at maximum contraction. In general, maximum contraction refers to the contraction of the first fluid 110 (i.e. the displacement of the first fluid 110) that provides the largest area of the hydrophobic layer 106a that is in contact with or exposed to the second fluid 114. Incident light 208 entering the pixel or subpixel passes through a corresponding color filter element 202 and is reflected from at least one of electrode layer 102, optional dielectric barrier layer 106b, or hydrophobic layer 106a, or reflector layer (not illustrated) (collectively referred to herein as "reflective layer") and passes back through the corresponding color filter element 202, thus exiting the electrowetting display device 204. For example, as can be seen in FIG. 2B, incident light 208 can enter through a green color filter element 202g and exit through the same green color filter element 202g, thus creating green light 210g. Incident light 208 can also enter through a white color filter element 202w and exit through the same white color filter element 202w, producing white light 210w. However, as can be seen in FIG. 2B, some of the incident light 208a can enter through the white color filter element 202w past a height 110h of the first fluid 110 at maximum contraction and between the black matrix grid 212 and the pixel wall 108, thereby passing into an adjacent pixel or subpixel. The entering white light 208a is then reflected out of the adjacent pixel or subpixel and through a green color filter element 202g, thereby providing green light 210a that may not be desired. This is generally referred to as crosstalk among the pixels or subpixels.

FIGS. 2C and 2D illustrate the electrowetting display device 204 operating in a low gray scale mode, i.e., the pixels or subpixels are substantially "closed" such that the first fluid 110 is substantially covering the hydrophobic layer 106a. Various elements of the electrowetting display device may not be illustrated in FIG. 2D, or may be illustrated in a simplified fashion, for clarity and ease of description. For example, common electrode 126 is not illustrated. As can be seen, incident light 208a that enters into the pixels or subpixels through the green and white color filter elements 202g, 202w may be reflected as light 210g at edges of the hydrophobic layer 106a where the first fluid 110 does not quite cover the hydrophobic layer 106a through an adjacent pixel or subpixel and the adjacent pixel's or subpixel's corresponding color filter 202w, 202g thereby causing crosstalk. More particularly, incident light 208a may enter through a green color filter 202g and exit through an adjacent white color filter 202w and thus, the pixel or subpixel corresponding to the white color filter 202w will produce green light. Likewise, incident light 208a may enter through a white color filter 202w and exit through an adjacent green color filter 202g and thus, green light may be produced that is not desired. Accordingly, with such a situation, the low gray scale display may appear green.

Figure 2E:
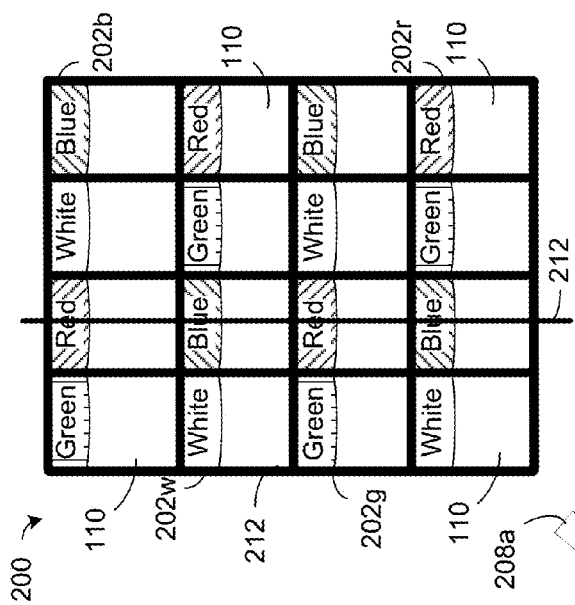
Figure 2F:
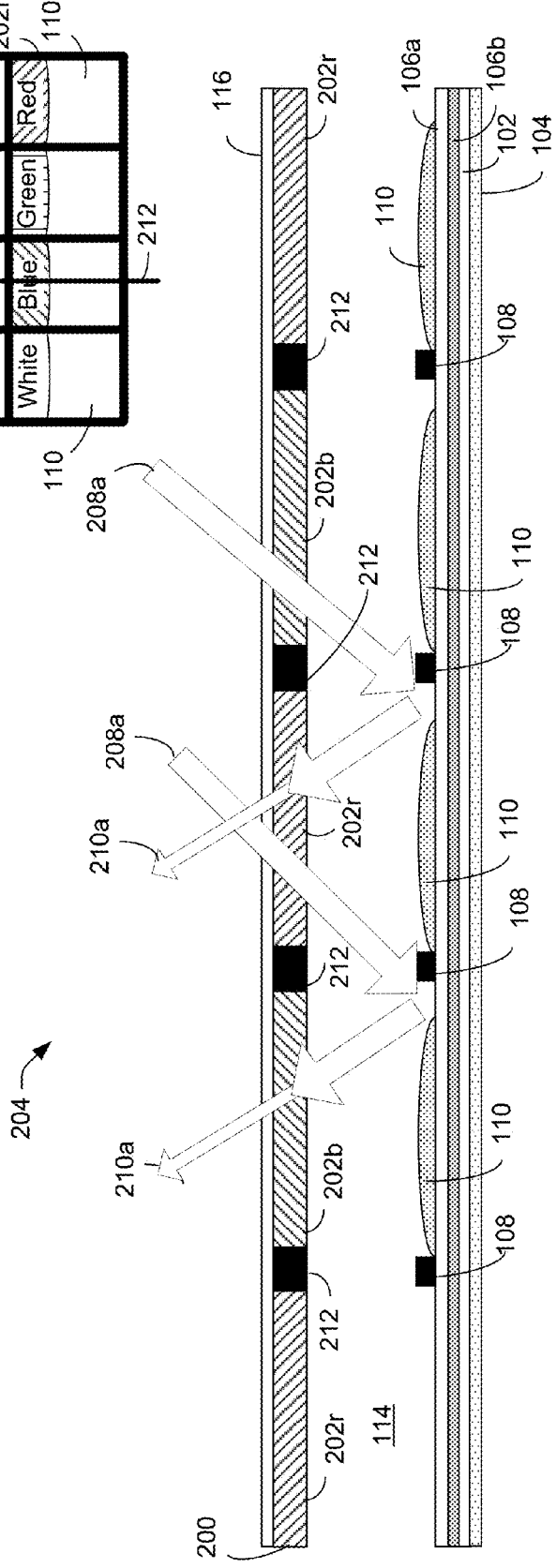
Figure 2G:
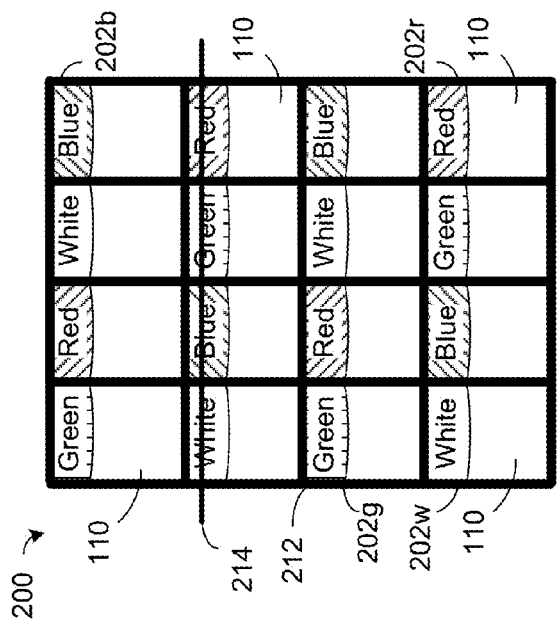
Figure 2H:
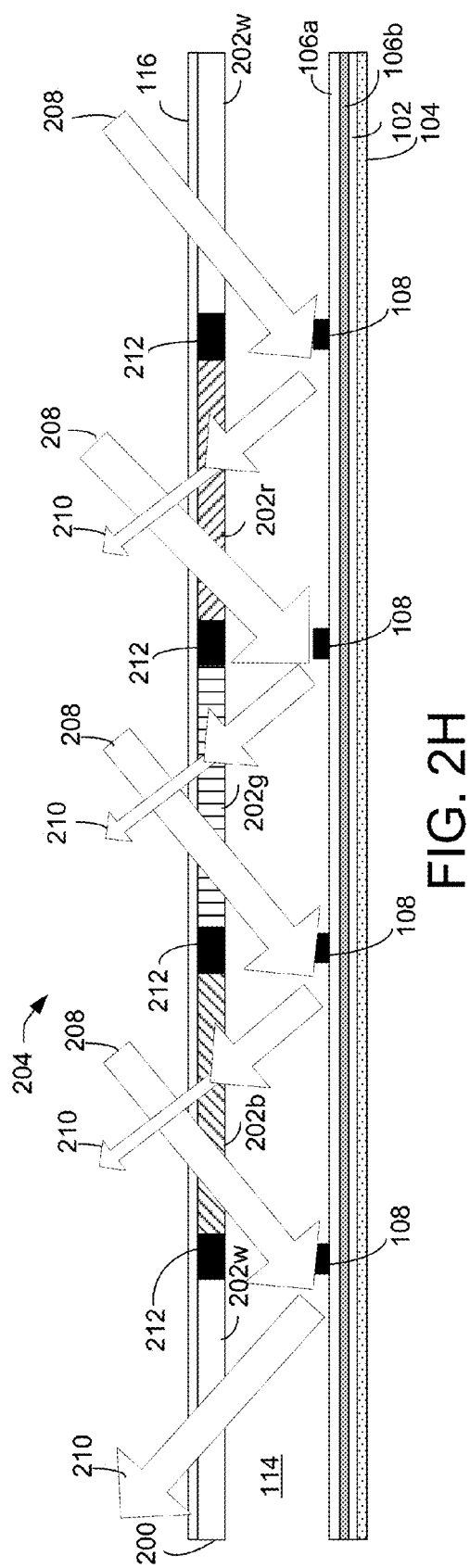

Referring to FIGS. 2E and 2F, in the row of pixels or subpixels along line 212, crosstalk generally does not occur among the red color filter elements 202r and the blue color filter elements 202b because the red and blue colors are at opposite ends of the color spectrum, thereby cancelling each other out to cause a generally black or dark (i.e. purple) appearance of reflected light 210a. Thus, low gray scales are generally not accurately from pixels or subpixels in the columns that include red and blue color filter elements 202r, 202b. Referring to FIGS. 2G and 2H, in the horizontal direction represented by line 214, low gray scales may generally be displayed properly from rows that include red and blue color filter elements 202r, 202b. However, there may be a bit of purple crosstalk due to the combination of red and blue crosstalk from incident light 208a entering a blue color filter 202b but the reflected light 210a exiting an adjacent white color filter 202w in combination with incident light 208a entering the white color filter 202w but the reflected light 210a exiting an adjacent red color filter 202r. However, such crosstalk is generally regarded as negligible. Various elements of the electrowetting display device may not be illustrated in FIGS. 2F and 2G, or may be illustrated in a simplified fashion, for clarity and ease of description. For example, common electrode 126 is not illustrated.

Figure 3A:
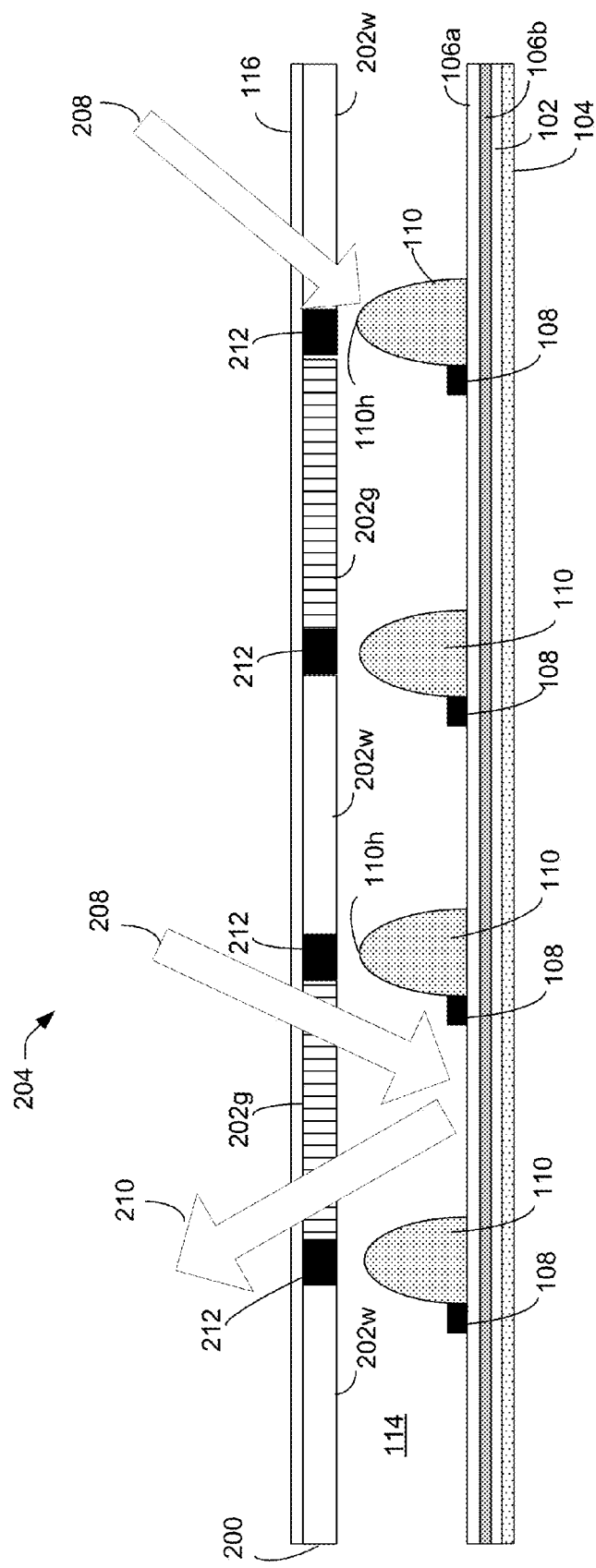

In accordance with various embodiments, as can be seen in FIG. 3A, the array 200 of color filter elements 202 and the black matrix grid 212 are shifted in a vertical direction along line 206 of FIG. 2A, i.e., along a major axis of the rectangular shaped array 200 when the array 200 of color filter elements 202 are included in the electrowetting display 204. Thus, the array 200 and black matrix grid 212, when disposed on the top support plate 116, are offset, i.e. misaligned, with respect to the pixel walls 108 such the array 200 and black matrix grid 212 do not align with the pixel walls 108 disposed on the bottom support plate 104 in the vertical direction, as can be seen in FIG. 3A. Thus, the color filter elements 202 are not aligned with the pixels or subpixels (electrowetting elements 100b), i.e. the color filter elements 202 are misaligned with respect to the pixels or subpixels. The black matrix grid 212 is arranged such that the black matrix grid 212 is substantially aligned with "peaks" of the first fluid 110 when pixels or subpixels are activated, i.e. at locations where the height 110h of the first fluid 110 is at maximum contraction. Thus, the array 200 of color filter elements 202 is shifted such that the color filter elements 202 are aligned with actual openings of the first fluid 110 in the pixels or subpixels (electrowetting elements 100b), i.e. locations on the hydrophobic surface 106a where the first fluid 110 is not present and has been replaced by the second fluid 114. Additionally, the shift of the black matrix grid 212 and the array 200 is in a direction that is opposite to a direction of contraction of the first fluid 110. Thus, if the first fluid 110 contracts in more than one direction, the black matrix grid 212 and array 200 may shift in more than one direction such that the color filter elements 202 are aligned with actual openings of the first fluid 110 in the pixels or subpixels (electrowetting elements 100b). Generally, the spacers 120 (not illustrated in FIG. 2A) do not shift. Various elements of the electrowetting display device may not be illustrated in FIG. 3A, or may be illustrated in a simplified fashion, for clarity and ease of description. For example, common electrode 126 is not illustrated.

In embodiments, only the black matrix grid 212 may be shifted and thus, the black matrix grid 212 may overlap with color filter elements 202 such that the black matrix grid 212 is actually positioned over individual color filter elements 202 as opposed to edges between individual color filter elements 202. In such an embodiment, the color filter elements 202 are aligned with the pixels or subpixels (electrowetting elements 100b), i.e. edges of the color filter elements 202 are aligned with respect to the pixel walls 108. Additionally, in embodiments, only the array 200 of color filter elements 202 may be shifted and thus, the color filter elements 202 may overlap with the black matrix grid 212 such that the black matrix grid 212 is actually positioned over individual color filter elements 202 as opposed to edges between individual color filter elements 202. In such an embodiment, the color filter elements 202 are not aligned with the pixels or subpixels (electrowetting elements 100b), i.e. the color filter elements 202 are misaligned with respect to the pixels or subpixels.

Accordingly, when the pixels or subpixels are activated, i.e., in a full open position, the first fluid 110 moves towards the pixel walls 108. As can be seen in FIG. 3A, crosstalk may not occur, or may be minimized, because the height 110h of the contracted first fluid 110 at maximum contraction under the array 200 blocks light 208 that would otherwise be directed through one pixel or subpixel towards an adjacent pixel or subpixel between the array 200 and pixel walls 108 as illustrated in FIG. 2A. Alternatively, the black matrix grid 212 above the height 110h of the first fluid 110 at maximum contraction blocks the reflected light. Thus, crosstalk may not occur, or may be minimized, between columns of green pixels or subpixels and white pixels or subpixels, as well as columns of red pixels or subpixels and blue pixels or subpixels. Thus, undesired green light may be minimized due to crosstalk. Likewise, luminance may be improved due to elimination or minimization of crosstalk between columns of red pixels or subpixels and blue pixels or subpixels.

As can be seen in FIG. 3B, when the electrowetting display 204 is operating in a low gray scale mode, i.e., the first fluid 110 is substantially covering the hydrophobic layer 106a, light 208 entering a pixel or subpixel and reflecting off the reflective layer exits through the same color filter element 202 of the same pixel or subpixel. Light 208 that may enter the pixel or subpixel through the color filter element 202 at an angle such that its reflection might otherwise exit an adjacent pixel or subpixel, is blocked by the first fluid 110 under the array 200, as can be seen at 300. Alternatively, the black matrix grid 212 blocks the reflected light. Thus, during low gray scale mode operation, crosstalk may not occur, or may be minimized, between columns of green pixels or subpixels and white pixels or subpixels, as well as columns of red pixels or subpixels and blue pixels or subpixels. Thus, undesired green light may be minimized due to crosstalk. Likewise, luminance may be improved due to elimination or minimization of crosstalk between columns of red pixels or subpixels and blue pixels or subpixels. Various elements of the electrowetting display device may not be illustrated in FIG. 3B, or may be illustrated in a simplified fashion, for clarity and ease of description. For example, common electrode 126 is not illustrated.

Figure 3C:
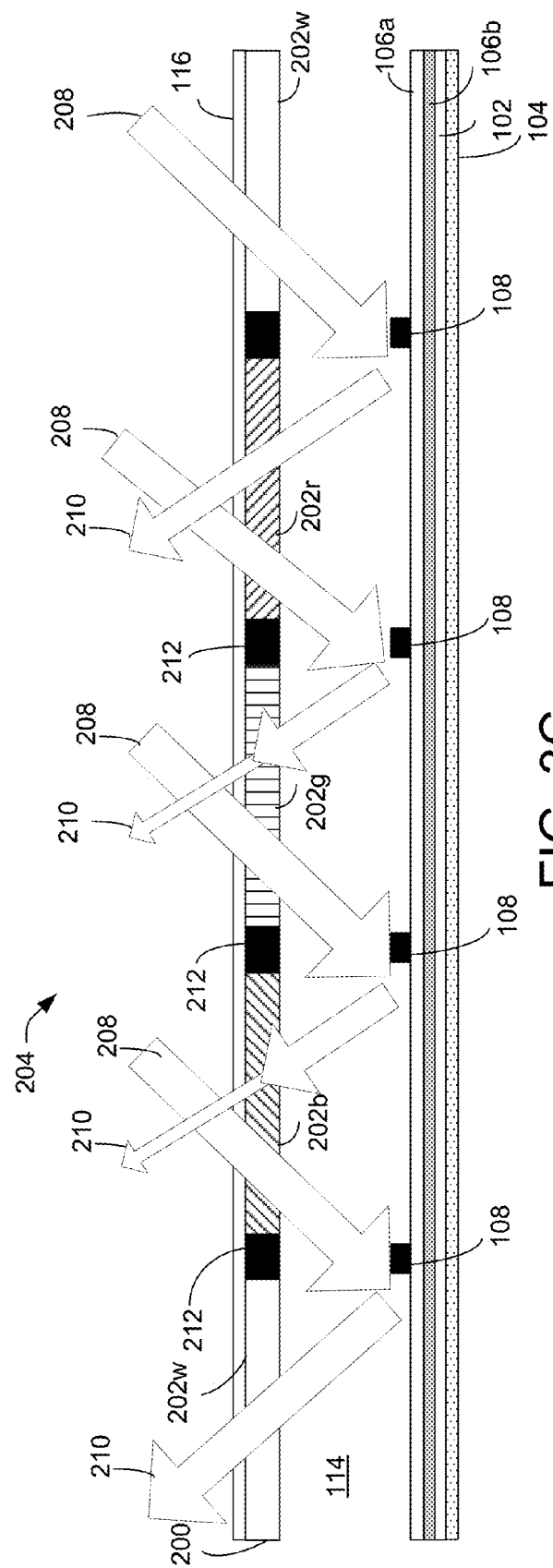

Referring to FIG. 3C, in the horizontal direction (e.g., line 214 of FIG. 2G), the array 200 is still aligned with the pixel walls 108. During low gray scale operation of the electrowetting display device 204, the misaligning of the black matrix 212 in the vertical direction (i.e. in a direction along line 206 of FIG. 2A), with the pixel walls 108, and thereby the color filter elements 202 with respect to the pixels or subpixels, may not have an effect on crosstalk. However, due to the relationship of the various color filter elements 202 within the color spectrum, the crosstalk that may still occur is generally deemed negligible. Various elements of the electrowetting display device may not be illustrated in FIG. 3C, or may be illustrated in a simplified fashion, for clarity and ease of description. For example, common electrode 126 is not illustrated.

It should be noted that by shifting the array 200 of color filter elements 202, pixels or subpixels at edges of the electrowetting display device 204 may have a different shape or size compared to other pixels or subpixels within the electrowetting display device 204. Such edge pixels or subpixels may thus be made smaller or larger in order to accommodate the misalignment of black matrix grid 212 and the array 200 of color filter elements 202. Alternatively, such edge pixels or subpixels may simply be sacrificed, i.e., not used in the electrowetting display device 204. Additionally, while the present disclosure has been described with respect to an RGBW display, as previously noted, other displays (and therefore other arrays of color filters) may be utilized such as, for example, an RGB display, a black and white display, etc. Furthermore, while the present disclosure has been described with respect to a rectangular shaped electrowetting display device 204 (and hence a rectangular shaped array 200 of color filter elements 202), as previously noted, other shapes may be utilized such as, for example, square, triangular, etc. Additionally, while the present disclosure has been described with respect to misaligning the array 200 and the black matrix grid 212 with respect to the pixel walls 108 and pixels or subpixels in one (i.e. vertical) direction, it may be desirable to offset or misalign the array 200 and the black matrix grid 212 (or just the black matrix grid 212) with respect to the pixel walls 108 in another direction and/or in more than one direction. Furthermore, in embodiments, individual color filter elements 202 may be offset or misaligned in different and/or multiple directions with respect to each other in the array 200. For example, red and blue color filter elements 202r, 202b may be offset in a first direction and green and white color filter elements 202g, 202w may be offset in a second direction.

Figure 4A:
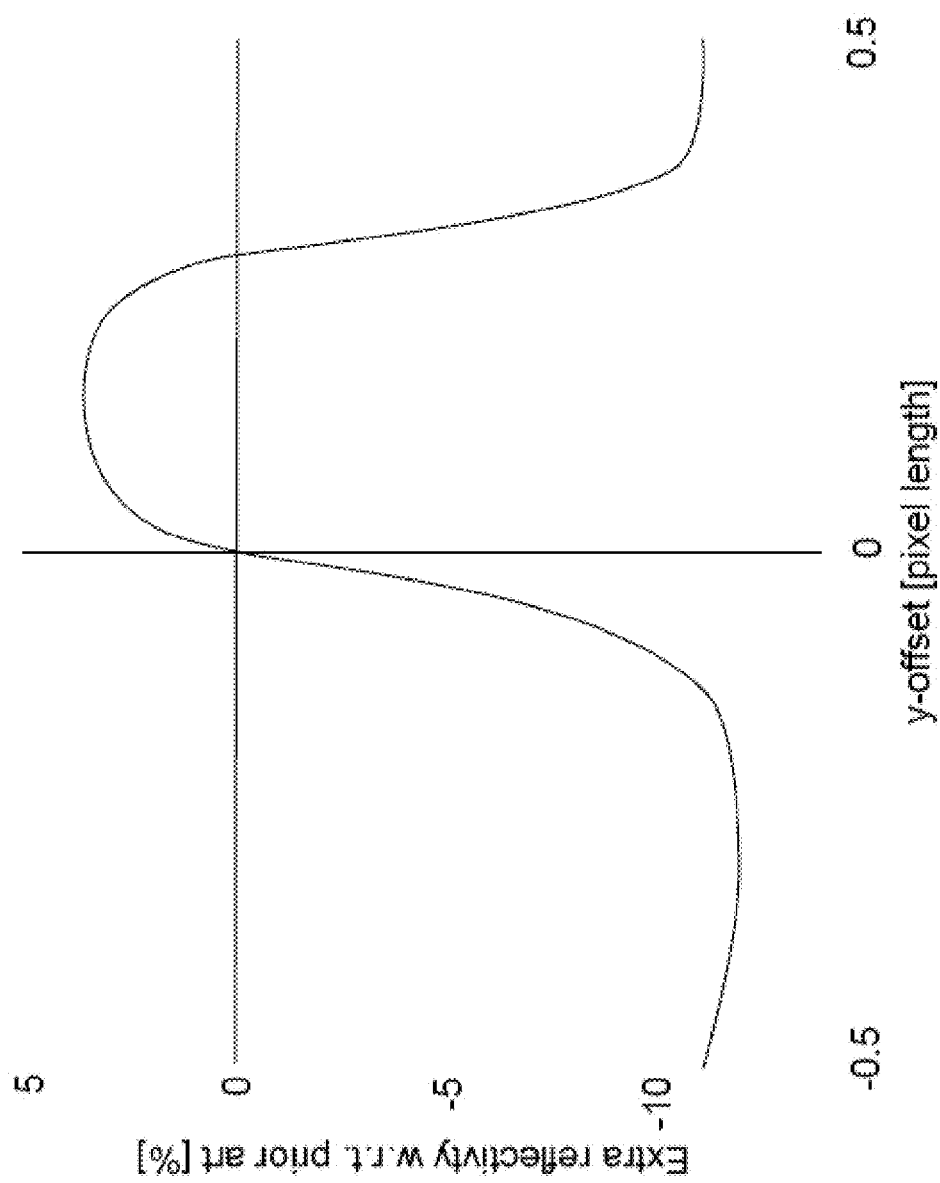
FIGS. 4A and 4B illustrate simulated display reflectivity as a function of alignment of a black matrix grid with pixel walls of an electrowetting display device according to some embodiments.
Figure 4B:
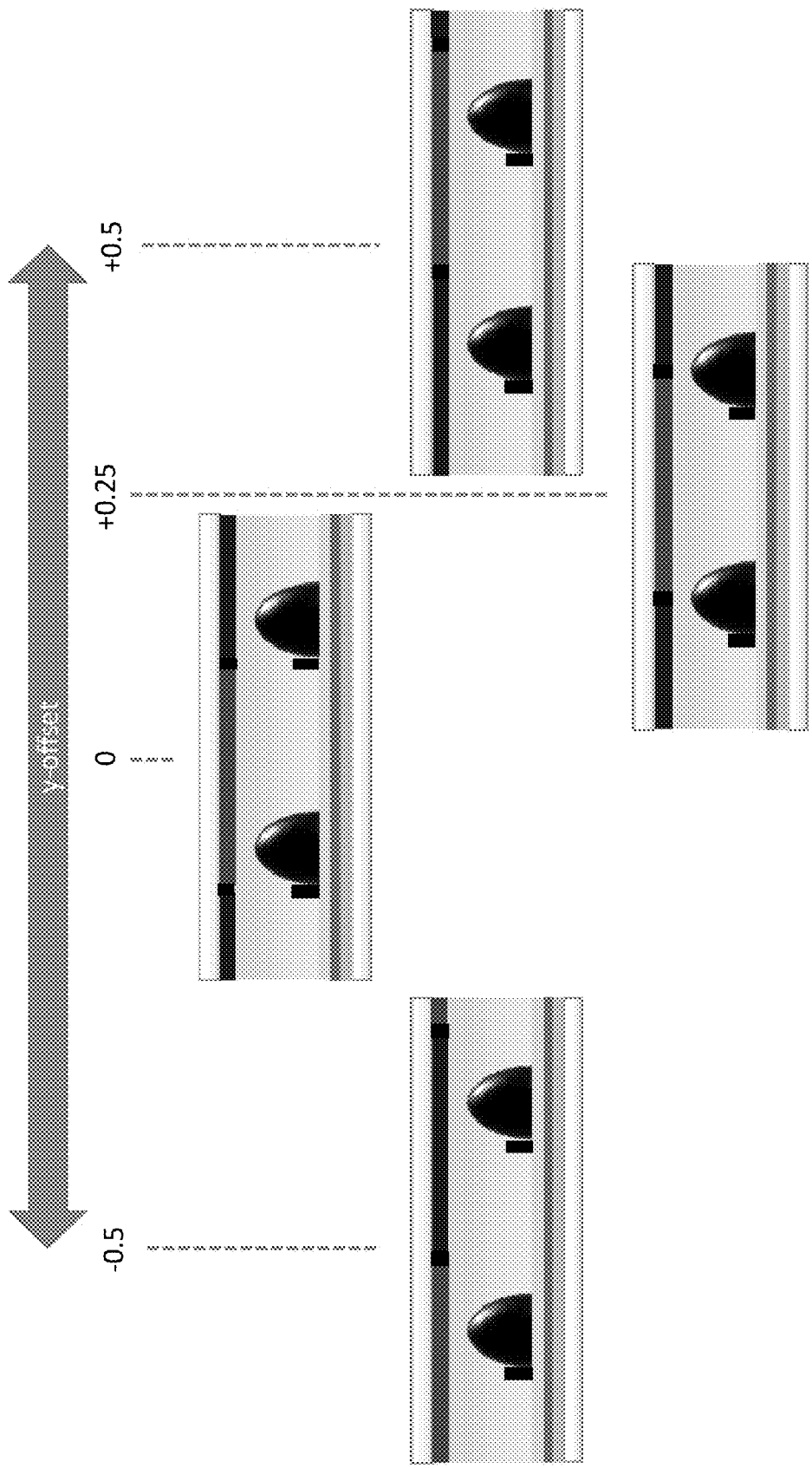

Referring to FIGS. 4A and 4B, a relationship for how far to shift the array 200 and black matrix grid 212 may be explained. FIG. 4A illustrates the benefit of deliberately shifting at least the black matrix grid 212 disposed on the top support plate 116 with respect to the electrowetting elements 100b (pixels or subpixels) disposed on the bottom support plate 104 and aligning the array 200 of color filter elements 202 with the actual openings of the first fluid 110 in the electrowetting elements 100b. FIG. 4A shows an example of display reflectivity of an RGBW display for different top-bottom alignments. On the horizontal axis is the shift of the black matrix grid 212 with respect to the pixel walls 108. A shift of y=0 corresponds to the default case where the black matrix grid 212 is aligned with the pixel walls 108. The shift has been normalized to a chosen pixel or subpixel length such that a y-offset of 1 corresponds to one pixel subpixel length. FIG. 4B provides a schematic representation of the location of the black matrix grid 212 for different offsets.

The vertical axis in FIG. 4A represents the percentage increase (or decrease) in display white reflectance with respect to the default case where the black matrix grid 212 is aligned with the pixel walls 108, i.e. zero shift. As indicted in FIG. 4B, the shift direction is defined such that starting from zero, the black matrix grid 212 first starts to cover a first fluid 110 collection area (during activation of the pixels or subpixels) adjacent to a pixel wall 108. The reflectivity has a periodicity of one normalized pixel or subpixel. The optimum shift of the black matrix grid 212 for a given display system to obtain optimized reflectivity can be simulated using a dedicated light source, e.g. a hemispherical light source, and a predetermined viewing direction. FIG. 4A is an example of the change in reflection upon shift of the black matrix grid 212, i.e. color filter elements and black matrix. In the example the first fluid 110 covers 30% of the open area between pixel walls.

From FIG. 4A it may be observed that the electrowetting display has an improved reflectance (brightness) when the black matrix grid 212 is shifted over a height of the first fluid 110 at maximum contraction and the color filter elements 202 are aligned with the actual openings of the pixels or subpixels, i.e. over where the first fluid 110 is displaced when the pixels or subpixels are active. The difference in brightness depends both on which side of the pixel walls are covered by the array 200 from a given lighting and viewing direction and the amount of light blocked due to cross-talk between the color filters 202. For shifts in the range to approximately 0.3 pixels or subpixels, an improvement in reflectivity compared to prior art is shown. The effect of the black matrix 212 and the array 200 displacement and cross-talk is visible in the plot of data points in FIG. 4A.

Accordingly, shifting of an array of color filter elements and a black matrix grid such that the black matrix grid is not aligned with the pixel walls in at least one direction, e.g., a vertical or portrait direction (i.e. along a major axis) of a rectangular electrowetting display device, eliminates or reduces crosstalk among adjacent pixels or subpixels in the at least one direction. More particularly, the shift of the black matrix grid 212 and the array 200 is in a direction opposite to contraction of an oil in pixels or subpixels in the electrowetting display device and thus, may be in any direction and/or in multiple directions. Such an arrangement generally results in the edges of the color filter elements or black matrix that includes the color filter elements aligning with peaks of a first fluid at maximum contraction disposed on a bottom plate of the electrowetting display device as opposed to aligning with the pixel walls disposed on the bottom support plate. Furthermore, in embodiments, color filter elements are shifted such that the color filter elements are aligned with actual openings of the first fluid in the pixels or subpixels, i.e. locations where the first fluid is not present due to contraction and has been replaced by a second fluid. Such alignment can improve transmittance of reflected light from the pixels or subpixels, particularly through white color filters, thereby increasing reflectivity and luminance. Generally, the materials utilized for fabricating an electrowetting display device as described herein are the same as materials used in the manufacture of electrowetting display devices in general. During manufacturing of an electrowetting display device as described herein, patterning masks or altered patterning masks are needed in order to provide for proper alignment of the black matrix grid and/or the array of color filter elements.

Figure 5:
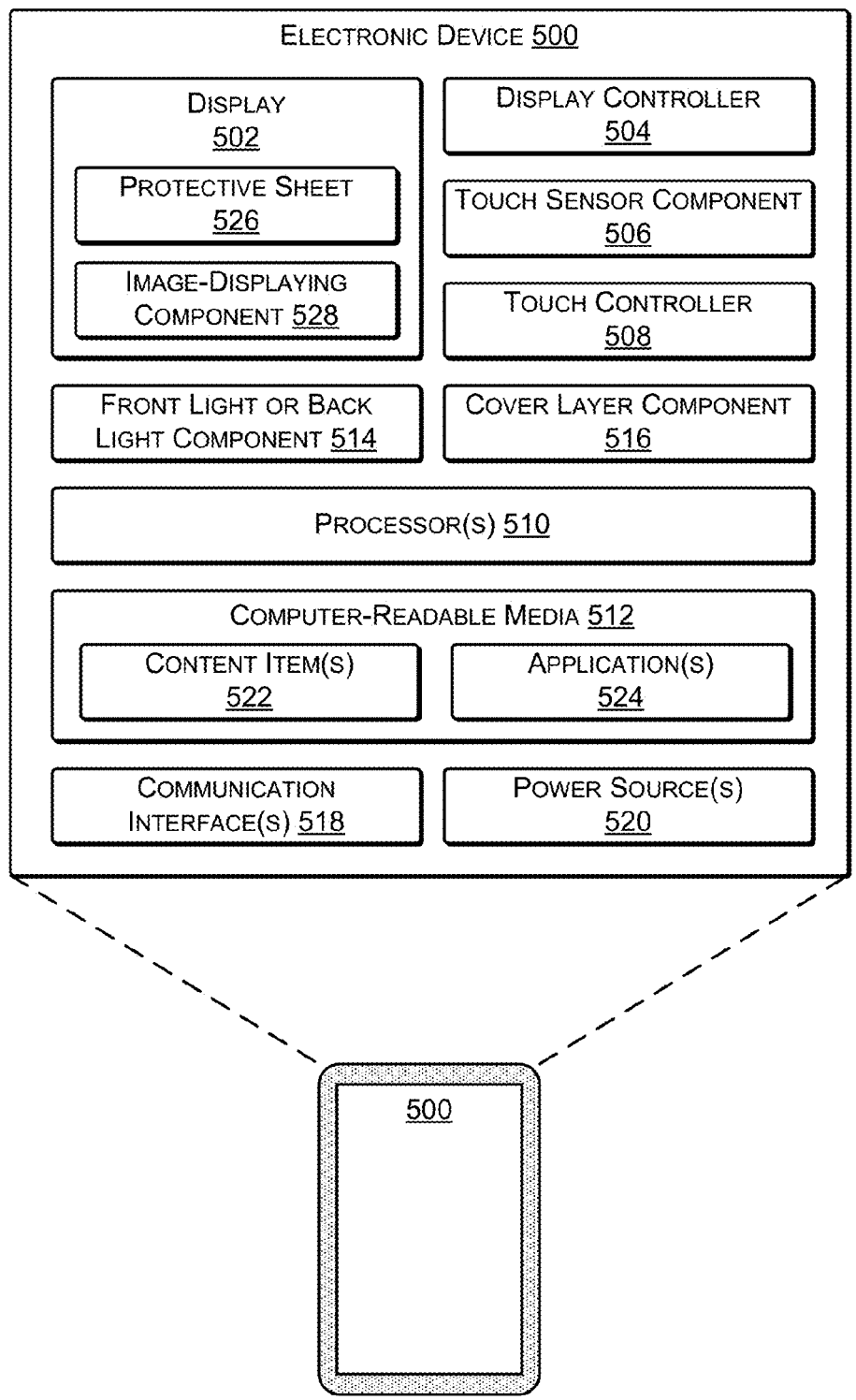
FIG. 5 illustrates an example electronic device that may incorporate a display device, according to some embodiments.

FIG. 5 illustrates an example electronic device 500 that may incorporate any of the display devices discussed above. The device 500 may comprise any type of electronic device having a display. For instance, the device 500 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 500 may be a non-mobile electronic device (e.g., a computer display, a television, etc.). In addition, while FIG. 5 illustrates several example components of the electronic device 500, it is to be appreciated that the device 500 may also include other conventional components, such as an operating system, system busses, input/output components, and the like. Further, in other examples, such as in the case of a television or computer monitor, the electronic device 500 may only include a subset of the components illustrated.

Regardless of the specific implementation of the electronic device 500, the device 500 includes a display 502 and a corresponding display controller 504. The display 502 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 502 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 500, the display 502 may be an active display such as a liquid crystal display, a plasma display, a light emitting diode display, an organic light emitting diode display, an electrowetting display and so forth. Accordingly, implementations herein are not limited to any particular display technology.

In an implementation, the display comprises an electrowetting display that employs an applied voltage to change the surface tension of a fluid in relation to a surface. For example, such an electrowetting display may be the same as or similar to the electrowetting displays illustrated in FIGS. 1 and 3A-3C, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels or subpixels of the display. When the voltage is absent, the colored oil forms a continuous film within a pixel or subpixel, and the color may thus be visible to a user of the display. On the other hand, when the voltage is applied to the pixel or subpixel, the colored oil is displaced and the pixel or subpixel becomes transparent. When multiple pixels or subpixels of the display are independently activated, the display can present a color or grayscale image. The pixels or subpixels may form the basis for a transmissive, reflective, or transmissive/reflective (transflective) display. Further, the pixels or subpixels may be responsive to high switching speeds (e.g., on the order of several milliseconds), while employing small pixel or subpixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels or subpixels. As such, the terms "white," "gray," and "black" may refer to varying degrees of color in implementations utilizing color displays. For instance, where a pixel or subpixel includes a red color filter, a "gray" value of the pixel or subpixel may correspond to a shade of pink while a "black" value of the pixel or subpixel may correspond to a darkest red of the color filter. Furthermore, while some examples herein are described in the environment of a reflective display, in other examples, the display 502 may represent a backlit display, examples of which are mentioned above.

In addition to including the display 502, FIG. 5 illustrates that some examples of the device 500 may include a touch sensor component 506 and a touch controller 508. In some instances, at least one touch sensor component 506 resides with, or is stacked on, the display 502 to form a touch-sensitive display (e.g., an electronic paper touch-sensitive display). Thus, the display 502 may be capable of both accepting user touch input and rendering content in response to or corresponding to the touch input. As several examples, the touch sensor component 506 may comprise a capacitive touch sensor, a force sensitive resistance (FSR), an interpolating force sensitive resistance (IFSR) sensor, or any other type of touch sensor. In some instances, the touch sensor component 506 is capable of detecting touches as well as determining an amount of pressure or force of these touches.

FIG. 5 further illustrates that the electronic device 500 may include one or more processors 510 and one or more computer-readable media 512, as well as a front light component 514 (which may alternatively be a backlight component in the case of a backlit display) for lighting the display 502, a cover layer component 516, such as a cover glass or cover sheet, one or more communication interfaces 518 and one or more power sources 520. The communication interfaces 518 may support both wired and wireless connection to various networks, such as cellular networks, radio, WiFi networks, short range networks (e.g., Bluetooth®), infrared (IR), and so forth.

Depending on the configuration of the electronic device 500, the computer-readable media 512 (and other computer-readable media described throughout) is an example of computer storage media and may include volatile and non-volatile memory. Thus, the computer-readable media 512 may include, but is not limited to, RAM, ROM, EEPROM, flash memory, or other memory technology, or any other medium that can be used to store computer-readable instructions, programs, applications, media items, and/or data which can be accessed by the electronic device 500.

The computer-readable media 512 may be used to store any number of functional components that are executable on the processor 510, as well as content items 522 and applications 524. Thus, the computer-readable media 512 may include an operating system and a storage database to store one or more content items 522, such as eBooks, audio books, songs, videos, still images, and the like. The computer-readable media 512 of the electronic device 500 may also store one or more content presentation applications to render content items on the device 500. These content presentation applications may be implemented as various applications 524 depending upon the content items 522. For instance, the content presentation application may be an electronic book reader application for rending textual electronic books, an audio player for playing audio books or songs, a video player for playing video, and so forth.

In some instances, the electronic device 500 may couple to a cover (not illustrated in FIG. 5) to protect the display (and other components in the display stack or display assembly) of the device 500. In one example, the cover may include a back flap that covers a back portion of the device 500 and a front flap that covers the display 502 and the other components in the stack. The device 500 and/or the cover may include a sensor (e.g., a Hall effect sensor) to detect when the cover is open (i.e., when the front flap is not atop the display and other components). The sensor may send a signal to the front light component 514 when the cover is open and, in response, the front light component 514 may illuminate the display 502. When the cover is closed, meanwhile, the front light component 514 may receive a signal indicating that the cover has closed and, in response, the front light component 514 may turn off.

Furthermore, the amount of light emitted by the front light component 514 may vary. For instance, upon a user opening the cover, the light from the front light may gradually increase to its full illumination. In some instances, the device 500 includes an ambient light sensor (not illustrated in FIG. 5) and the amount of illumination of the front light component 514 may be based at least in part on the amount of ambient light detected by the ambient light sensor. For example, the front light component 514 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 502 may vary depending on whether the front light component 514 is on or off, or based on the amount of light provided by the front light component 514. For instance, the electronic device 500 may implement a larger default font or a greater contrast when the light is off compared to when the light is on. In some instances, the electronic device 500 maintains, when the light is on, a contrast ratio for the display that is within a certain defined percentage of the contrast ratio when the light is off.

As described above, the touch sensor component 506 may comprise a capacitive touch sensor that resides atop the display 502. In some examples, the touch sensor component 506 may be formed on or integrated with the cover layer component 516. In other examples, the touch sensor component 506 may be a separate component in the stack of the display assembly. The front light component 514 may reside atop or below the touch sensor component 506. In some instances, either the touch sensor component 506 or the front light component 514 is coupled to a top surface of a protective sheet 526 of the display 502. As one example, the front light component 514 may include a lightguide sheet and a light source (not illustrated in FIG. 5). The lightguide sheet may comprise a substrate (e.g., a transparent thermoplastic such as PMMA or other acrylic), a layer of lacquer and multiple grating elements formed in the layer of lacquer that function to propagate light from the light source towards the display 502, thus illuminating the display 502.

The cover layer component 516 may include a transparent substrate or sheet having an outer layer that functions to reduce at least one of glare or reflection of ambient light incident on the electronic device 500. In some instances, the cover layer component 516 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 526 may include a similar UV-cured hard coating on the outer surface. The cover layer component 516 may couple to another component or to the protective sheet 526 of the display 502. The cover layer component 516 may, in some instances, also include a UV filter, a UV-absorbing dye, or the like, for protecting components lower in the stack from UV light incident on the electronic device 500. In still other examples, the cover layer component 516 may include a sheet of high-strength glass having an antiglare and/or antireflective coating.

The display 502 includes the protective sheet 526 overlying an image-displaying component 528. For example, the display 502 may be preassembled to have the protective sheet 526 as an outer surface on the upper or image-viewing side of the display 502. Accordingly, the protective sheet 526 may be integral with and may overlie the image-displaying component 528. The protective sheet 526 may be optically transparent to enable a user to view, through the protective sheet 526, an image presented on the image-displaying component 528 of the display 502.

In some examples, the protective sheet 526 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 526 may include a coating, such as the hard coating described above. For instance, the hard coating may be applied to the outer surface of the protective sheet 526 before or after assembly of the protective sheet 526 with the image-displaying component 528 of the display 502. In some examples, the hard coating may include a photoinitiator or other reactive species in its composition, such as for curing the hard coating on the protective sheet 526. Furthermore, in some examples, the protective sheet 526 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 526, thereby protecting the image-displaying component 528 from UV light.

According to some implementations herein, one or more of the components discussed above may be coupled to the display 502 using fluid optically-clear adhesive (LOCA). For example, suppose that the light guide portion of the front light component 514 is to be coupled to the display 502. The light guide may be coupled to the display 502 by placing the LOCA on the outer or upper surface of the protective sheet 526. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 514 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 514. In other implementations, the LOCA may be placed near a center of the protective sheet 526, and pressed outwards towards a perimeter of the top surface of the protective sheet 526 by placing the front light component 514 on top of the LOCA. The LOCA may then be cured by directing UV light through the front light component 514. As discussed above, and as discussed additionally below, various techniques, such as surface treatment of the protective sheet, may be used to prevent discoloration of the LOCA and/or the protective sheet 526.

While FIG. 5 illustrates a few example components, the electronic device 500 may have additional features or functionality. For example, the device 500 may also include additional data storage devices (removable and/or non-removable) such as, for example, magnetic disks, optical disks, or tape. The additional data storage media, which may reside in a control board (not illustrated), may include volatile and nonvolatile, removable and non-removable media implemented in any method or technology for storage of information, such as computer readable instructions, data structures, program modules, or other data. In addition, some or all of the functionality described as residing within the device 500 may reside remotely from the device 500 in some implementations. In these implementations, the device 500 may utilize the communication interfaces 518 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. An electrowetting display comprising:
a first support plate;
a second support plate opposite to the first support plate;
an electrowetting element at least partly between the first support plate and the second support plate, the electrowetting element comprising:
a first fluid disposed at least partly on the first support plate; and
a second fluid disposed on the first fluid, wherein the second fluid is substantially immiscible with the first fluid;
a color filter element disposed on the second support plate;
at least one pixel wall, disposed on the first support plate, separating the electrowetting element from an adjacent electrowetting element; and
a grid configured to block light, the grid being offset with respect to the at least one pixel wall,
wherein the color filter element is positioned such that:
the color filter element is offset in at least one direction with respect to the electrowetting element, and
the color filter element is disposed over (i) at least a portion of the electrowetting element, (ii) at least a portion of the pixel wall, and (iii) at least a portion of the adjacent electrowetting element such that a first edge of the color filter element is disposed at least partly over a mid-portion of the electrowetting element and a second edge that is opposite to the first edge of the color filter is disposed at least partly over a mid-portion of the adjacent electrowetting element, and
wherein
a first portion of the grid is adjacent to the first edge of the color filter element and disposed at least partly over the mid-portion of the electrowetting element and a second portion of the grid is adjacent to the second edge of the color filter element and disposed at least partly over the mid-portion of the adjacent electrowetting element.

2. The electrowetting display of claim 1, wherein the color filter element is positioned such that the color filter element is offset in only one direction with respect to the electrowetting element.

3. The electrowetting display of claim 2, wherein the electrowetting display is rectangular shaped, and wherein the color filter element is offset with respect to the electrowetting element in a direction along a major axis of the rectangular shape of the electrowetting display.

4. The electrowetting display of claim 2, wherein the electrowetting display is rectangular shaped, and wherein the color filter element is offset with respect to the electrowetting element in a direction along a minor axis of the rectangular shape of the electrowetting display.

5. The electrowetting display of claim 1, wherein the color filter element is positioned such that the color filter element is at least one of offset (i) in multiple directions with respect to the electrowetting element or (ii) the color filter element is offset in different directions within an array of color filter elements.

6. The electrowetting display of claim 1, wherein the pixel walls are black.

7. The electrowetting display of claim 1, wherein the color filter element is arranged in an array of color filter elements comprising red color filters, green color filters, blue color filters and white color filters such that the electrowetting display is configured as a red-green-blue-white (RGBW) display.

8. The electrowetting display of claim 1, wherein the color filter element is offset with respect to the electrowetting element in a direction opposite to a direction in which the first fluid contracts within the electrowetting element, wherein the first edge of the color filter element is aligned with a location in the electrowetting element where the first fluid reaches maximum contraction such that reflected light from the electrowetting element is blocked by first fluid at maximum contraction in the electrowetting element from exiting through a color filter element of one of the adjacent electrowetting elements adjacent to the first fluid at maximum contraction, and wherein the color filter element is aligned with locations where the oil is displaced by electrolyte solution.

9. An electronic device comprising an electrowetting display comprising:
a first support plate and a second support plate opposite to the first support plate, wherein an electrowetting element is provided between the first support plate and the second support plate;
a first fluid within the electrowetting element and disposed on the first support plate;
a second fluid disposed on the first fluid, wherein the second fluid is substantially immiscible with the first fluid;
a pixel wall, disposed on the first support plate, separating the electrowetting element from an adjacent electrowetting element;
a grid configured to block light, the grid being offset with respect to the pixel wall, and
a color filter element disposed on the second support plate, wherein the color filter element is positioned over (i) a portion of the electrowetting element, (ii) the pixel wall, and (iii) a portion of the adjacent electrowetting element such that a first edge of the color filter element is over a mid-portion of the electrowetting element and a second edge that is opposite to the first edge of the color filter is over a mid-portion of the adjacent electrowetting element, and wherein a first portion of the grid is adjacent to the first edge of the color filter element and disposed over the mid-portion of the electrowetting element and a second portion of the grid is adjacent to the second edge of the color filter element and disposed over the mid-portion of the adjacent electrowetting element.

10. The electronic device of claim 9, wherein the color filter element is positioned such that the color filter element is offset in only one direction with respect to the electrowetting element.

11. The electronic device of claim 10, wherein the electrowetting display is rectangular shaped, and wherein the color filter element is offset with respect to the electrowetting element in a direction along a major axis of the rectangular shape of the electrowetting display.

12. The electronic device of claim 10, wherein the electrowetting display is rectangular shaped, and wherein the color filter element is offset with respect to the electrowetting element in a direction along a minor axis of the rectangular shape of the electrowetting display.

13. The electronic device of claim 9, wherein the color filter element is positioned such that color filter element is offset in multiple directions with respect to the electrowetting element.

14. The electronic device of claim 9, wherein the pixel wall is black.

15. An electrowetting display comprising:
a first support plate and a second support plate opposite to the first support plate, wherein a plurality of electrowetting elements, comprising a first electrowetting element and a second electrowetting element, is provided between the first support plate and the second support plate;
a first fluid within the electrowetting elements and disposed on the first support plate;
a second fluid disposed on the first fluid, wherein the second fluid is substantially immiscible with the first fluid; and
a plurality of color filter elements arranged in an array disposed on the second support plate, wherein the array of color filter elements is positioned such that the color filter elements are offset with respect to electrowetting elements in a direction opposite to a direction in which the first fluid contracts within the electrowetting elements, wherein edges of the color filter elements are aligned respectively with locations in the electrowetting elements where the first fluid reaches maximum contraction such that reflected light from the first electrowetting element is blocked by first fluid at maximum contraction in the first electrowetting element from exiting through a color filter element of the second electrowetting element adjacent to the first fluid at maximum contraction, and wherein color filter elements are aligned respectively with locations where the oil is displaced by electrolyte solution.

16. The electronic device of claim 9, wherein the grid is disposed in a same layer as the color filter element.

17. The electrowetting display of claim 1, wherein the grid is black.

18. The electrowetting display of claim 9, wherein the grid and the color filter element are at substantially equal distances from the second support plate.

19. The electrowetting display of claim 1, wherein the grid is disposed directly on the color filter element.

* * * * *